US011885266B2

(12) United States Patent
Ramanujam et al.

(10) Patent No.: US 11,885,266 B2
(45) Date of Patent: Jan. 30, 2024

(54) STEAM CYCLE METHODS, SYSTEMS, AND APPARATUS FOR EFFICIENTLY REDUCING CARBON FOOTPRINTS IN PLANT SYSTEMS

(71) Applicant: J. RAY MCDERMOTT, S.A., Houston, TX (US)

(72) Inventors: Venkata Krishnan Ramanujam, Sugar Land, TX (US); Srinivas Rajabahadur Arcot, Fulshear, TX (US); Venkata Appala Nuti, Katy, TX (US)

(73) Assignee: J Ray McDermott S.A., Houston, TX (US)

( * ) Notice: Subject to any disclaimer, the term of this patent is extended or adjusted under 35 U.S.C. 154(b) by 108 days.

(21) Appl. No.: 17/657,996

(22) Filed: Apr. 5, 2022

(65) Prior Publication Data

US 2022/0333529 A1 Oct. 20, 2022

Related U.S. Application Data

(60) Provisional application No. 63/174,959, filed on Apr. 14, 2021.

(51) Int. Cl.
*F02C 7/16* (2006.01)
*F02C 7/14* (2006.01)
*F02C 7/22* (2006.01)

(52) U.S. Cl.
CPC .................. *F02C 7/16* (2013.01); *F02C 7/14* (2013.01); *F02C 7/222* (2013.01); *F05D 2220/72* (2013.01); *F05D 2260/213* (2013.01); *F05D 2260/232* (2013.01); *F05D 2260/61* (2013.01)

(58) Field of Classification Search
CPC .... F02C 7/16; F02C 7/14; F02C 7/222; F05D 2220/72; F05D 2260/213; F05D 2260/232; F05D 2260/61
See application file for complete search history.

(56) References Cited

U.S. PATENT DOCUMENTS

2008/0104939 A1 5/2008 Hoffmann
2014/0047818 A1* 2/2014 Oelkfe ...................... F02C 3/34 60/274
2015/0232773 A1* 8/2015 Iijima ................ C07C 29/1518 585/324

FOREIGN PATENT DOCUMENTS

EP 2905433 A1 5/2008

OTHER PUBLICATIONS

International Search Report/ Written Opinion issued to PCT/US2022/023407 dated Sep. 12, 2022.

* cited by examiner

*Primary Examiner* — Shafiq Mian
(74) *Attorney, Agent, or Firm* — Patterson + Sheridan, LLP

(57) ABSTRACT

Aspects of the present disclosure relate to steam cycle methods, systems, and apparatus for efficiently reducing carbon footprints in plant systems. In one aspect, a cycle is conducted in a plant system to collect $CO_2$. In one aspect, a cycle is conducted in a plant system to recycle energy. The plant system includes one or more of a power production system, a refining system, and/or a petrochemical processing system.

20 Claims, 3 Drawing Sheets

STEAM CYCLE METHODS, SYSTEMS, AND APPARATUS FOR EFFICIENTLY REDUCING CARBON FOOTPRINTS IN PLANT SYSTEMS

CROSS-REFERENCE TO RELATED APPLICATIONS

This application claims priority to United States Provisional Patent Application Ser. No. 63/174,959, filed on Apr. 14, 2021, which herein is incorporated by reference.

BACKGROUND

Field

Aspects of the present disclosure relate to steam cycle methods, systems, and apparatus for efficiently reducing carbon footprints in power production systems, refining systems, and/or petrochemical processing systems. In one aspect, a cycle is conducted in a petrochemical processing system to collect carbon dioxide ($CO_2$). In one aspect, a cycle is conducted in a petrochemical processing system to recycle energy.

Description of the Related Art

Power production systems, refining systems, and petrochemical processing systems can involve wasted energy, such as energy generated during process operations. This energy is typically transferred to atmosphere in the form of heat. Power production systems, refining systems, and petrochemical processing systems can also involve $CO_2$ emissions, such as $CO_2$ that can be emitted to atmosphere.

Therefore, there is a need for methods, systems, and apparatus that facilitate collecting $CO_2$, and recycling operational energy to facilitate reduced carbon footprints, increased cost efficiencies, and increased operational efficiencies (such as thermal efficiencies) for power production systems, refining systems, and/or petrochemical processing systems.

SUMMARY

Aspects of the present disclosure relate to steam cycle methods, systems, and apparatus for efficiently reducing carbon footprints of plant systems. In one aspect, a cycle is conducted in a plant system to collect $CO_2$. In one aspect, a cycle is conducted in a plant system to recycle energy. The plant system includes one or more of a power production system, a refining system, and/or a petrochemical processing system.

In one implementation, a steam cycle system for plant systems includes a fuel feed line to supply a fuel mixture to one or more pieces of equipment of a plant system. The steam cycle system includes a first expansion turbine to couple to an exhaust line of the one or more pieces of equipment, and a first separator. The first separator includes an inlet, a lower outlet coupled to a water feed line, an upper outlet coupled to the fuel feed line. The steam cycle system includes a first heat exchanger unit. The first heat exchanger unit includes a first heat exchanger inlet line coupled to the first expansion turbine, and a first heat exchanger outlet line coupled to the inlet of the first separator. The first heat exchanger unit includes a second heat exchanger inlet line coupled to the water feed line, and a second heat exchanger outlet line coupled to the fuel feed line.

In one implementation, a steam cycle system for plant systems includes a fuel feed line to supply a fuel mixture to one or more pieces of equipment of a plant system. The steam cycle system includes a first expansion turbine to couple to an exhaust line of the one or more pieces of equipment, and a first separator. The first separator includes an inlet, a lower outlet coupled to a water feed line, an upper outlet coupled to the fuel feed line. The upper outlet of the first separator is coupled to the fuel feed line through a compressor coupled to a fuel inlet line. The steam cycle system includes a first heat exchanger unit. The first heat exchanger unit includes a first heat exchanger inlet line coupled to the first expansion turbine, and a first heat exchanger outlet line coupled to the inlet of the first separator. A side outlet line is coupled between the fuel feed line and the first heat exchanger inlet line. The first heat exchanger unit includes a second heat exchanger inlet line coupled to the water feed line, and a second heat exchanger outlet line coupled to the fuel feed line.

In one implementation, a method of operating a plant system includes separating nitrogen from a supply of air to generate oxygen, and supplying the oxygen to a fuel mixture in a fuel feed line. The method includes expanding an exhaust flow from one or more heaters of the plant system in a first expansion turbine, and cooling the exhaust flow in a first flow path of a first heat exchanger unit. The method includes separating a liquid composition of the exhaust flow from a gas composition of the exhaust flow. The liquid composition of the exhaust flow includes water and the gas composition of the exhaust flow includes steam and $CO_2$. The method includes supplying the gas composition of the exhaust flow to the fuel mixture in the fuel feed line, and heating the liquid composition in a second flow path of the first heat exchanger unit to generate a high pressure steam. The method includes expanding the high pressure steam in a second expansion turbine to generate a medium pressure steam, and supplying the medium pressure steam to the fuel mixture in the fuel feed line. The method includes feeding the fuel mixture to the one or more heaters to combust the fuel mixture.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
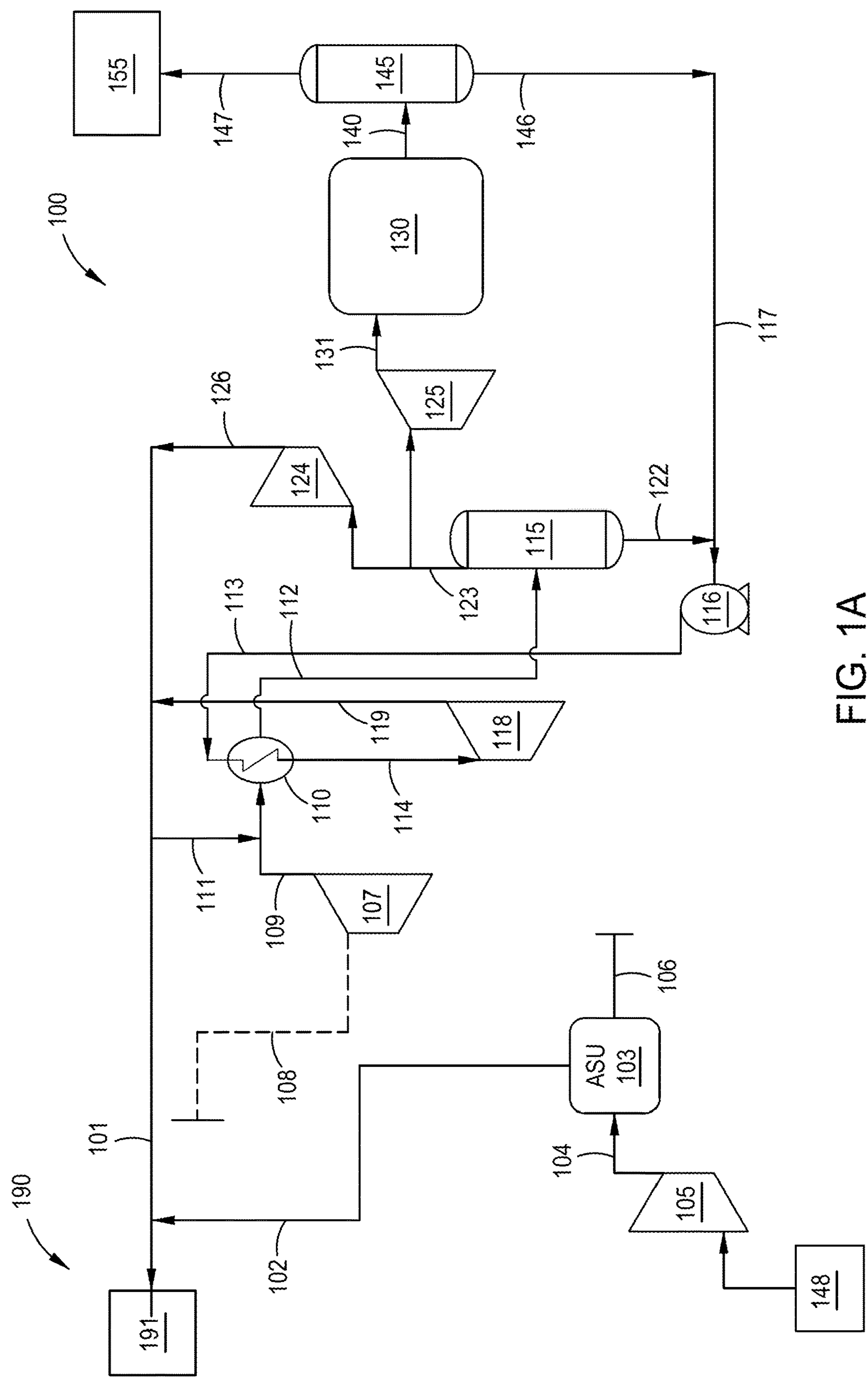
FIG. 1A is a schematic partial view of a steam cycle system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to steam cycle methods, systems, and apparatus for efficiently reducing carbon footprints in Refining, Petrochemical and Power systems. In one aspect, a cycle is conducted in a plant system to collect $CO_2$. In one aspect, a cycle is conducted in a plant system to recycle energy. The plant system includes one or more of a power production system, a refining system, and/or a petrochemical processing system.

The present disclosure contemplates that use of terms such as "coupled," "coupled," "couples", and/or "coupling" can include direct coupling and/or indirect coupling, such as coupling through other components. The present disclosure also contemplates that use of terms such as "coupled," "couple," "couples", and/or "coupling" can include connecting, welding, and/or fastening using fasteners, such as pins, rivets, screws, bolts, and/or nuts. The present disclosure also contemplates that use of terms such as "coupled," "couple," "couples", and/or "coupling" can include fluid coupling, such as one or more connections to establish fluid communication.

FIG. 1A is a schematic partial view of a steam cycle system 100, according to one implementation. The steam cycle system 100 is coupled to or a part of a plant system 190. The steam cycle system 100 is configured to conduct a steam cycle. The plant system 190 includes one or more of a power production system, a refining system, and/or a petrochemical processing system (such as a liquefied natural gas (LNG) system). The steam cycle system 100 is coupled to one or more pieces of equipment 191 of the plant system 190. The one or more pieces of equipment 191 include one or more crackers (such as thermal cracker(s) and/or catalytic cracker(s)), one or more gas turbine generators, and/or one or more heaters (such as combustible heaters, for example furnaces, burners, and/or boilers). The one or more gas turbine generators can be used in the power production system. In one embodiment, which can be combined with other embodiments, the one or more pieces of equipment 191 include one or more heaters of the one or more crackers. The one or more heaters can be cogeneration heaters, such as coal-fired cogeneration heaters.

A fuel feed line 101 coupled to the one or more pieces of equipment 191 feeds a fuel mixture to the one or more pieces of equipment 191. The fuel mixture is combusted in the one or more pieces of equipment 191. The fuel mixture includes oxygen, medium pressure steam, and $CO_2$. An oxygen line 102 is coupled to the fuel feed line 101 to supply the oxygen to the fuel feed line 101. An air separation unit 103 is coupled to an air line 104, and a first compressor 105 is disposed along the air line 104. The air line 104 is coupled to an air supply 148. The air supply 148 supplies air, such as from atmosphere, to the first compressor 105. The first compressor 105 increases a pressure of the air, and the air is supplied to the air separation unit 103. The air separation unit 103 separates nitrogen of the air from oxygen of the air, and the oxygen is supplied to the fuel feed line 101 using the oxygen line 102. The nitrogen which is separated is supplied to a nitrogen line 106.

A first expansion turbine 107 is coupled to an exhaust line 108 of the one or more pieces of equipment 191. The exhaust line 108 supplies an exhaust flow to the first expansion turbine 107. The exhaust flow includes $CO_2$ and high pressure steam. The exhaust flow can also include ammonia, nitrogen, argon, and/or one or more LNGs. The exhaust flow includes byproducts generated during combustion in the one or more pieces of equipment 191, and exhausted from the one or more pieces of equipment 191. The exhaust flow is flowed through the first expansion turbine 107 to reduce the exhaust flow from a high pressure to a medium pressure. The exhaust flow is flowed through the first expansion turbine 107 and to a first heat exchanger (HX) inlet line 109 coupled to the first expansion turbine 107. The first HX inlet line 109 inlets into a first heat exchanger unit (HXU) 110. A side outlet line 111 coupled between the fuel feed line 101 and the first HX inlet line 109 supplies (e.g., returns) medium pressure steam and $CO_2$ to the first HX inlet line 109 from the fuel feed line 101, in addition to the exhaust flow supplied using the first expansion turbine 107. The side outlet line 111 and the first expansion turbine 107 together supply a first HX flow to the first HXU 110 through the first HX inlet line 109. The first HX flow in the first HX inlet line 109 includes a composition that is 80-90% by volume or moles (such as 87% by volume or moles) medium pressure steam and 10-20% by volume or moles (such as 13% by volume or moles) $CO_2$. The first HX flow includes the exhaust flow received from the one or more pieces of equipment.

The first HX flow flows through the first HXU 110 and to a first HX outlet line 112. As the first HX flow flows from the first HX inlet line 109, through the first HXU 110, and to the first HX outlet line 112, the first HX flow exchanges heat with a second HX flow that flows from a second HX inlet line 113, through the first HXU 110, and to a second HX outlet line 114. The first HX inlet line 109 and the first HX outlet line 112 are a part of a first flow path of the first HXU 110.

As the first HX flow and the second HX flow move (e.g., flow) through the first HXU 110, heat transfers from the first HX flow and to the second HX flow. At least a portion of the medium pressure steam of the first HX flow condenses into water facilitated by the heat transfer in the first HXU 110, and the medium pressure steam is depressurized to a low pressure steam facilitated by the heat transfer in the first HXU 110. The first HX flow in the first HX outlet line 112 is supplied to a first separator 115 coupled to the first HX outlet line 112. The second HX flow in the second HX inlet line 113 includes water in liquid phase. The water is supplied to the second HX inlet line 113 using a pump 116 coupled to a water feed line 117. The water feed line 117 is coupled to the second HX inlet line 113 through the pump 116. The water of the second HX flow boils into high pressure steam facilitated by the heat transfer in the first HXU 110, as the second HX flow flows from the second HX inlet line 113, through the first HXU 110, and to the second HX outlet line 114. The first HXU 110 is a boiler that boils the second HX flow. The high pressure steam in the second HX outlet line 114 is supplied to a second expansion turbine 118 coupled to the second HX outlet line 114.

The second expansion turbine 118 facilitates reducing the pressure of the high pressure steam in the second HX outlet line 114 to a medium pressure steam in a side inlet line 119 coupled between the second expansion turbine 118 and the fuel feed line 101. The side inlet line 119 supplies the medium pressure steam to the fuel feed line 101. An operating pressure in the fuel feed line 101, the first HX inlet line 109, the first HX outlet line 112, the second HX inlet line 113, and the side inlet line 119 is 40 bar or less, such as 36 bar or less. An operating pressure in the second HX outlet line 114 is within a range of 70 bar to 90 bar, such as 80 bar. The second HX inlet line 113 and the second HX outlet line 114 are a part of a second flow path of the first HXU 110.

The first separator 115 separates a liquid composition (including the liquid water) of the first HX flow from a gas composition of the first HX flow. The gas composition of the first HX flow includes the low pressure steam, the ammonia, and the $CO_2$ of the first HX flow. The liquid composition separated using the first separator 115 is supplied to the water feed line 117 using a lower outlet 122 of the first separator 115 that is coupled to the water feed line 117. The gas composition flows to an upper outlet 123 of the first separator 115. The gas composition in the upper outlet 123 is split and supplied respectively to a second compressor 124 and a third expansion turbine 125. A first portion of the gas composition in the upper outlet 123 is supplied to the second compressor. A second portion of the gas composition in the upper outlet 123 is supplied to the third expansion turbine 125 to generate a cycle flow. The upper outlet 123 is coupled to the second compressor 124 and the third expansion turbine 125. The first portion of the gas composition in the upper outlet 123 to the second compressor 124 is pressurized in the second compressor 124. The second compressor 124 is used to pressurize the low pressure steam of the first portion of the gas composition in the upper outlet 123 to a medium pressure steam. The first portion of the gas composition of the exhaust flow (including the medium pressure steam, the ammonia, and the $CO_2$) is supplied to the fuel feed line 101 from the second compressor 124 through a fuel inlet line 126 coupled between the second compressor 124 and the fuel feed line 101.

The second portion of the gas composition of the exhaust flow in the upper outlet 123 (including the low pressure steam, the ammonia, and the $CO_2$) split to the third expansion turbine 125 is reduced in temperature and in pressure in the third expansion turbine 125 to generate a cycle flow. The cycle flow (including the low pressure steam, the water, the ammonia, and the $CO_2$) are supplied to a $CO_2$ cycle system 130 using a cycle inlet 131 coupled to the third expansion turbine 125. A pressure of the cycle flow (including the low pressure steam) is reduced using the third expansion turbine 125 such that the pressure is within a range of 2 psi-absolute (psia) (0.138 bar) to 3 psia (0.207 bar) in the cycle inlet 131 and the $CO_2$ cycle system 130. The pressure can be less than 2 psia (0.138 bar), such as less than 1 psia (0.069 bar), in the cycle inlet 131 and the $CO_2$ cycle system 130. The $CO_2$ cycle system 130 is configured to conduct a $CO_2$ cycle. In one embodiment, which can be combined with other embodiments, the $CO_2$ cycle is a low temperature and dry $CO_2$ cycle. In one embodiment, which can be combined with other embodiments, the $CO_2$ cycle system 130 is a low temperature heat recovery system or a waste recovery system.

Figure 1B:
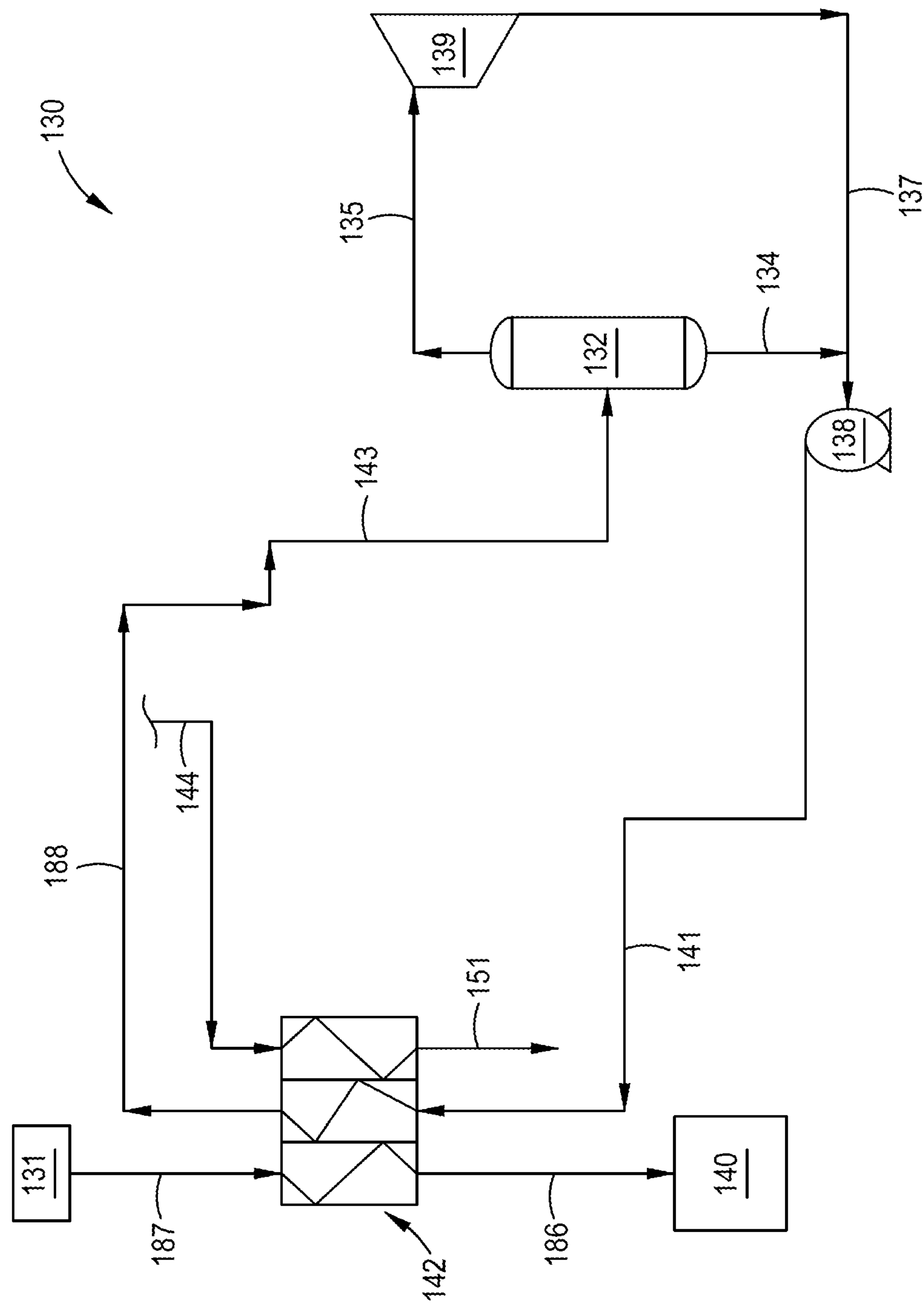
FIG. 1B is a schematic partial view of the $CO_2$ cycle system shown in FIG. 1A, according to one implementation.

FIG. 1B is a schematic partial view of the $CO_2$ cycle system 130 shown in FIG. 1A, according to one implementation. The $CO_2$ cycle system 130 includes a second separator 132. A second cycle flow (including one or more of low pressure steam, water, ammonia, and/or $CO_2$ either alone or in any combination thereof) are supplied to an inlet 143 of the second separator 132 from a first HX outlet line 188. A lower outlet 134 of the second separator 132 separates a liquid phase of the second cycle flow from a gas phase of the second cycle flow. The liquid phase of the second cycle flow exits the second separator 132 at the lower outlet 134. The gas phase of the second cycle flow exits the second separator 132 at an upper outlet 135. The liquid phase (including water) of the second cycle flow proceeds to a pump line 137 coupled to a second pump 138. The lower outlet 134 is coupled to the pump line 137. The second pump 138 is a multi-phase pump. The gas phase of the second cycle flow proceeds to a fourth expansion turbine 139 coupled to the upper outlet 135. The fourth expansion turbine 139 is coupled to the pump line 137.

The liquid phase of the second cycle flow and the gas phase flowing through the pump line 137 are pumped using the second pump 138 to a first HX inlet line 141 of the second HXU 142. The first HX inlet line 141 is coupled to the pump line 137 through the second pump 138. The liquid phase and the second portion of the gas phase split to the pump line 137 flow from the first HX inlet line 141, through the second HXU 142, and to a first HX outlet line 143 of the second HXU 142.

The second HXU 142 includes a second HX inlet line 144 and a second HX outlet line 151 coupled to any low temperature heat source of plant system 190. One or more low temperature heat streams from the second HX inlet line 144 flow through the second HXU 142, and to the second HX outlet line 151. The cycle flow exits the third expansion turbine 125 (shown in FIG. 1A) and flows from the cycle inlet 131 and into a third HX inlet line 187 of the second HXU 142 as a third stream. The cycle flow acting as the third stream is utilized as a hot stream and is cooled as the cycle flow flows through the second HXU 142 that is coupled to a cycle outlet 140 through a third HX outlet line 186. The cycle outlet 140 is routed back to a third separator 145 shown in FIG. 1A. Heat transfers from the cycle inlet 131 and to the first HX inlet line 141. Heat also transfers from the second HX inlet line 144 and to the first HX inlet line 141. The liquid phase and the gas phase of the second cycle flow flows to the pump line 137. A temperature of the liquid phase and the gas phase of the second cycle flow in the pump line 137 is increased in the second HXU 142. The liquid phase and the gas phase of the second cycle flow then flows to the inlet 143 of the second separator 132 through the first HX outlet line 188. An operating pressure in the inlet 133, the pump line 137, and/or the first HX inlet line 141 is within a range of 290 bar to 310 bar, such as 300 bar.

The inlet of the third separator 145 is coupled to the cycle outlet 140 from the second HXU 142. The third separator 145 separates a liquid composition (such as water and/or ammonia) of the outlet flow from a gas composition of the outlet flow. The liquid composition separated in the third separator 145 exits at a lower outlet 146 of the third separator 145. The lower outlet 146 is coupled to the water feed line 117. The liquid composition flows from the lower outlet 146 and to the water feed line 117. The gas composition of the outlet flow exits the third separator 145 at an upper outlet 147 of the third separator 145. The gas composition exiting the third separator 145 at the upper outlet 147 is mostly $CO_2$. The gas composition exiting the third separator 145 at the upper outlet 147 is 75-100% $CO_2$ by mass, volume, or moles (such as 75-100% $CO_2$ by mass). The gas compositions having $CO_2$ in the upper outlet 147 is not vented to atmosphere but is collected in a $CO_2$ collector 155 (such as in a tank) for re-use or is fed to other equipment of the plant system 190 for re-use. The upper outlet 147 is coupled to the $CO_2$ collector 155. Collecting the $CO_2$ for re-use facilitates reducing $CO_2$ emissions for the plant system 190 and reducing the carbon footprint of the plant system 190. A first temperature of the $CO_2$ in the cycle inlet 131 is within a range of 300 degrees Fahrenheit to 350 degrees Fahrenheit. A second temperature of the $CO_2$ in the cycle outlet 140 is within a range of 100 degrees Fahrenheit to 150 degrees Fahrenheit. Aspects of the disclosure facilitate collecting and reusing energy generated in the plant system 190, rather than releasing the $CO_2$ to atmosphere at the first temperature.

The present disclosure contemplates that each of the separators 115, 132, 145 can be a gravity separator, such as a vertical separator or a horizontal separator. The present disclosure contemplates that each of the separators 115, 132, 145 can alternatively be a phase separator. It is noted that the separators the 115, 132, and 145 need not all be the same type of separator (e.g., gravity of phase). Each of the turbines 107, 118, 125, 139 is rotatable to generate electricity. The electricity generated using the turbines 107, 118, 125, 139 can be used in other equipment of the plant system 190, such as the compressors 105, 124 and/or the pumps 116, 138. The steam cycle system 100 has a thermal efficiency of 60% or greater, and facilitates reduced $CO_2$ emissions for Refining, Petrochemical and Power systems.

The present disclosure contemplates that the steam cycle system 100 and the $CO_2$ cycle system 130 can be implemented and retrofitted into existing Refining, Petrochemical and Power systems.

Figure 2:
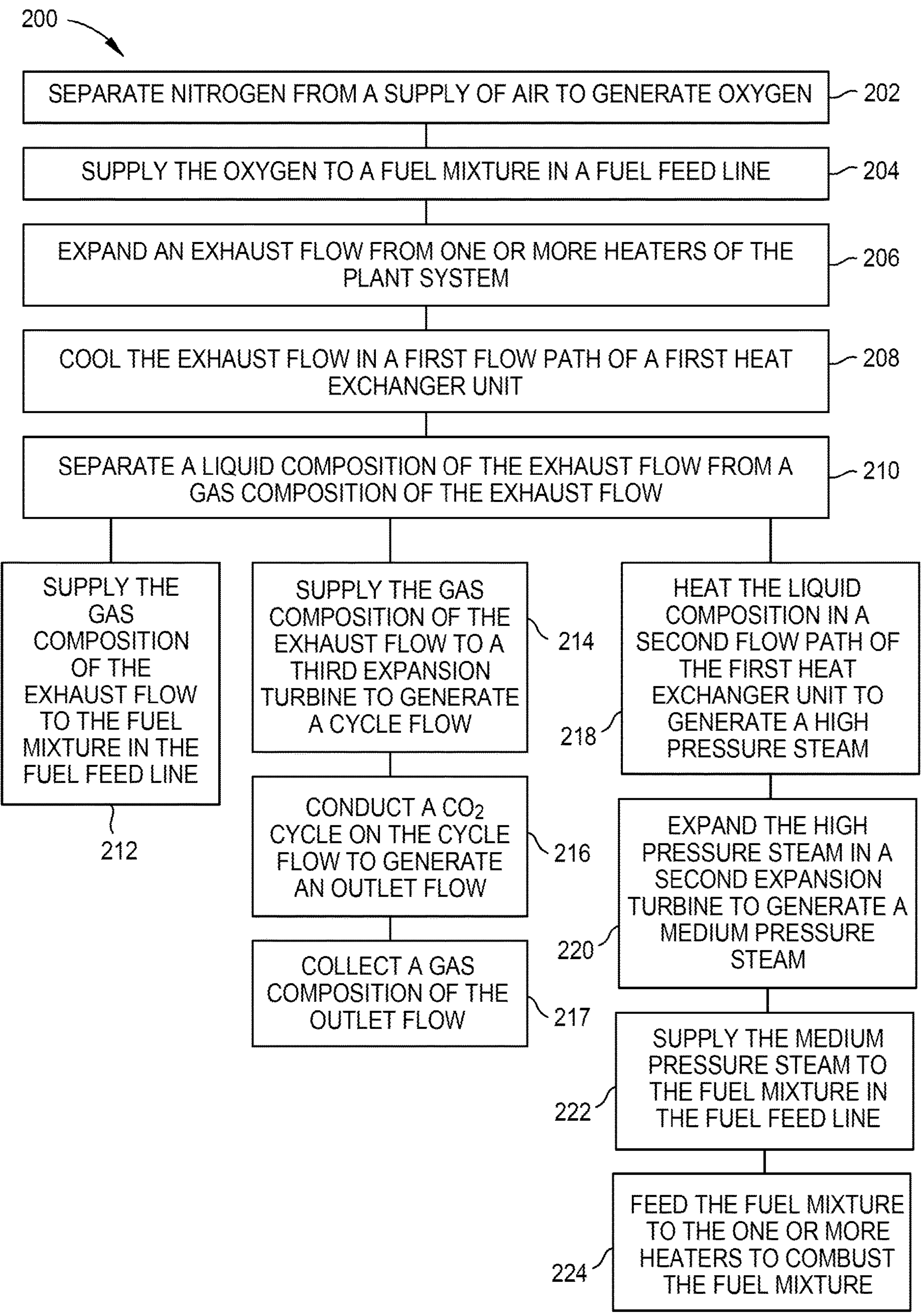
FIG. 2 is a schematic view of a method of operating a plant system, according to one implementation.

FIG. 2 is a schematic view of a method 200 of operating a plant system, according to one implementation. The plant system includes one or more of a power production system, a refining system, and/or a petrochemical processing system (such as a liquefied natural gas (LNG) system). Operation 202 of the method 200 includes separating nitrogen from a supply of air to generate oxygen. In one embodiment, which can be combined with other embodiments, the supply of air is compressed in a first compressor prior to separating the nitrogen from the supply of air at operation 202. Operation 204 includes supplying the oxygen to a fuel mixture in a fuel feed line.

Operation 206 includes expanding an exhaust flow from one or more heaters of the plant system in a first expansion turbine. Operation 208 includes cooling the exhaust flow in a first flow path of a first heat exchanger unit. Operation 210 includes separating a liquid composition of the exhaust flow from a gas composition of the exhaust flow. The liquid composition of the exhaust flow includes water and the gas composition of the exhaust flow includes steam and $CO_2$.

Operation 212 includes supplying the gas composition of the exhaust flow to the fuel mixture in the fuel feed line. In one embodiment, which can be combined with other embodiments, the supplying the gas composition of the exhaust flow to the fuel mixture in the fuel feed line includes compressing the gas composition of the exhaust flow in a second compressor. In one embodiment, which can be combined with other embodiments, a portion of the gas composition of the exhaust flow supplied to the fuel mixture in the fuel feed line is returned to the first flow path of the first heat exchanger unit.

Operation 214 includes supplying the gas composition of the exhaust flow to a third expansion turbine to generate a cycle flow, and operation 216 includes conducting a $CO_2$ cycle on the cycle flow. The $CO_2$ cycle includes one or more of the operations, aspects, components, properties, and/or features of the $CO_2$ cycle conducted using the $CO_2$ cycle system 130 described above. Operation 216 includes collecting a gas composition of the outlet flow. The gas composition of the outlet flow includes $CO_2$.

Operation 218 includes heating the liquid composition in a second flow path of the first heat exchanger unit to generate a high pressure steam. Operation 220 includes expanding the high pressure steam in a second expansion turbine to generate a medium pressure steam.

Operation 222 includes supplying the medium pressure steam to the fuel mixture in the fuel feed line. Operation 224 includes feeding the fuel mixture to the one or more heaters to combust the fuel mixture.

The present disclosure contemplates that one or more (such as all) of the operations 202, 204, 206, 208, 210, 212, 214, 216, 218, 220, 222, and/or 224 can be conducted simultaneously.

Benefits of the present disclosure include collecting $CO_2$, recycling operational energy, reduced carbon footprints, increased cost efficiencies, and increased operational efficiencies (such as thermal efficiencies) for plant systems. As an example, it is believed that the aspects described herein can reduce the carbon footprint of a plant system (which can include one or more of a power production system, a refining system, and/or a petrochemical processing system) by a factor of 5.5 or more at a thermal efficiency of 60% or greater. As another example, it is believed that the aspects described herein can eliminate $CO_2$ emissions of heaters (such as combustion heaters) or crackers at a thermal efficiency of 60% or greater.

It is contemplated that one or more of these aspects disclosed herein may be combined. Moreover, it is contemplated that one or more of these aspects may include some or all of the aforementioned benefits. As an example, the present disclosure contemplates that one or more of the aspects, features, components, operations, and/or properties of the steam cycle system 100, the plant system 190, the $CO_2$ cycle system 130, and/or the method 200 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A steam cycle system for plant systems, comprising:
- a fuel feed line to supply a fuel mixture to one or more pieces of equipment of a plant system;
- a first expansion turbine to couple to an exhaust line of the one or more pieces of equipment;
- a first separator comprising:
  - an inlet,
  - a lower outlet coupled to a water feed line, and
  - an upper outlet coupled to the fuel feed line; and
- a first heat exchanger unit comprising:
  - a first heat exchanger inlet line coupled to the first expansion turbine,
  - a first heat exchanger outlet line coupled to the inlet of the first separator,
  - a second heat exchanger inlet line coupled to the water feed line, and
  - a second heat exchanger outlet line coupled to the fuel feed line.

2. The steam cycle system of claim 1, wherein the second heat exchanger inlet line is coupled to the water feed line through at least a pump.

3. The steam cycle system of claim 1, wherein the second heat exchanger outlet line is coupled to the fuel feed line through a second expansion turbine and a side inlet line coupled to the fuel feed line.

4. The steam cycle system of claim 3, wherein the upper outlet of the first separator is coupled to the fuel feed line through a compressor coupled to a fuel inlet line.

5. The steam cycle system of claim 4, a side outlet line is coupled between the fuel feed line and the first heat exchanger inlet line.

6. The steam cycle system of claim 1, further comprising an air separation unit coupled to the fuel feed line through an oxygen line, wherein the air separation unit is coupled to an air supply through a compressor.

7. The steam cycle system of claim 1, wherein the upper outlet of the first separator is further coupled to a third expansion turbine.

8. The steam cycle system of claim 7, further comprising a $CO_2$ cycle system, the $CO_2$ cycle system comprising:
- a cycle inlet coupled to the third expansion turbine;
- a second separator comprising:
  - an inlet,
  - a lower outlet coupled to a pump line, and
  - an upper outlet coupled to a fourth expansion turbine;
- a second heat exchanger unit comprising:
  - a first heat exchanger inlet line coupled to the pump line through the pump,
  - a first heat exchanger outlet line coupled to the inlet of the second separator,
  - a second heat exchanger inlet line coupled to a low temperature heat source of the plant system, and
  - a second heat exchanger outlet line coupled to the low temperature heat source of the plant system
  - a third heat exchanger inlet line coupled to the cycle inlet, and a third heat exchanger outlet line; and
- a pump coupled to the pump line; and
- a cycle outlet coupled to the third heat exchanger outlet line.

9. The steam cycle system of claim 8, wherein the fourth expansion turbine is further coupled to the pump line.

10. The steam cycle system of claim 9, further comprising a third separator, the third separator comprising:
- an inlet coupled to the cycle outlet;
- a lower outlet coupled to the water feed line; and
- an upper outlet coupled to a $CO_2$ collector.

11. A steam cycle system for plant systems, comprising:
- a fuel feed line to supply a fuel mixture to one or more pieces of equipment of a plant system;
- a first expansion turbine to couple to an exhaust line of the one or more pieces of equipment;
- a first separator comprising:
  - an inlet,
  - a lower outlet coupled to a water feed line, and
  - an upper outlet coupled to the fuel feed line, the upper outlet of the first separator coupled to the fuel feed line through a compressor coupled to a fuel inlet line; and
- a first heat exchanger unit comprising:
  - a first heat exchanger inlet line coupled to the first expansion turbine, wherein a side outlet line is coupled between the fuel feed line and the first heat exchanger inlet line,
  - a first heat exchanger outlet line coupled to the inlet of the first separator,
  - a second heat exchanger inlet line coupled to the water feed line, and
  - a second heat exchanger outlet line coupled to the fuel feed line.

12. The steam cycle system of claim 1, wherein the second heat exchanger inlet line is coupled to the water feed line through at least a pump.

13. A method of operating a plant system, comprising:
- separating nitrogen from a supply of air to generate oxygen;
- supplying the oxygen to a fuel mixture in a fuel feed line;
- expanding an exhaust flow from one or more heaters of the plant system in a first expansion turbine;
- cooling the exhaust flow in a first flow path of a first heat exchanger unit;
- separating a liquid composition of the exhaust flow from a gas composition of the exhaust flow, the liquid composition of the exhaust flow comprising water and the gas composition of the exhaust flow comprising steam and $CO_2$;
- supplying the gas composition of the exhaust flow to the fuel mixture in the fuel feed line;
- heating the liquid composition in a second flow path of the first heat exchanger unit to generate a high pressure steam;
- expanding the high pressure steam in a second expansion turbine to generate a medium pressure steam;
- supplying the medium pressure steam to the fuel mixture in the fuel feed line; and
- feeding the fuel mixture to the one or more heaters to combust the fuel mixture.

14. The method of claim 13, further comprising:
- supplying the gas composition of the exhaust flow to a third expansion turbine to generate a cycle flow;
- conducting a $CO_2$ cycle on the cycle flow, the $CO_2$ cycle comprising:
  - separating a liquid composition of a second cycle flow from a gas composition of the second cycle flow in a second separator, the liquid composition of the second cycle flow comprising water and the gas composition of the second cycle flow comprising $CO_2$,
  - supplying the liquid composition and the gas composition of the second cycle flow to a first flow path of a second heat exchanger unit,
  - transferring heat from the cycle flow to the second cycle flow,
  - returning the liquid composition and the gas composition of the cycle flow to the second separator,
  - expanding the gas composition of the second cycle flow in a fourth expansion turbine, and
  - after the transferring of heat, supplying the cycle flow to a third separator as an outlet flow.

15. The method of claim 14, wherein the conducting the $CO_2$ cycle on the cycle flow comprises flowing a fluid through a second flow path of the second heat exchanger unit.

16. The method of claim 14, further comprising separating a liquid composition of the outlet flow from a gas composition of the outlet flow in the third separator.

17. The method of claim 16, further comprising:
- heating the liquid composition of the outlet flow in the second flow path of the first heat exchanger unit to generate the high pressure steam; and
- collecting the gas composition of the outlet flow, the gas composition of the outlet flow comprising $CO_2$.

18. The method of claim 13, further comprising returning a portion of the gas composition of the exhaust flow to the first flow path of the first heat exchanger unit.

19. The method of claim 13, wherein the supply of air is compressed in a first compressor prior to separating the nitrogen from the supply of air.

20. The method of claim 19, wherein the supplying the gas composition of the exhaust flow to the fuel mixture in the fuel feed line comprises compressing the gas composition of the exhaust flow in a second compressor.

* * * * *